United States Patent
Wang et al.

(10) Patent No.: US 9,232,581 B2
(45) Date of Patent: Jan. 5, 2016

(54) OUTPUT CURRENT COMPENSATION FOR JITTER IN INPUT VOLTAGE FOR DIMMABLE LED LAMPS

(71) Applicant: Dialog Semiconductor Inc., Campbell, CA (US)

(72) Inventors: Xiaoyan Wang, Milpitas, CA (US); Liang Yan, Milpitas, CA (US); Nan Shi, Newark, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 14/191,077

(22) Filed: Feb. 26, 2014

(65) Prior Publication Data
US 2014/0239840 A1    Aug. 28, 2014

Related U.S. Application Data

(60) Provisional application No. 61/770,280, filed on Feb. 27, 2013.

(51) Int. Cl.
*H05B 33/08* (2006.01)

(52) U.S. Cl.
CPC ........ *H05B 33/0815* (2013.01); *H05B 33/0854* (2013.01); *Y02B 20/347* (2013.01)

(58) Field of Classification Search
CPC ........ H05B 37/00; H05B 37/02; H05B 33/00; H05B 33/02; H05B 33/08; H05B 33/0803; H05B 33/0815; H05B 33/0824; H05B 33/0833; H05B 33/0839; H05B 33/0842; H05B 33/0845; H05B 33/0851; H05B 33/0896
USPC ............ 315/224, 307, 308, 219, 209 R, 194, 315/276, 279, 282
See application file for complete search history.

(56) References Cited

U.S. PATENT DOCUMENTS

| | | | |
|---|---|---|---|
| 8,456,108 B2* | 6/2013 | Kimura et al. | 315/307 |
| 2007/0285028 A1* | 12/2007 | Tsinker et al. | 315/224 |
| 2009/0167203 A1* | 7/2009 | Dahlman | H05B 33/0818 |
| | | | 315/291 |
| 2010/0213870 A1 | 8/2010 | Koolen | |
| 2011/0291592 A1* | 12/2011 | Anissimov | 315/307 |
| 2012/0146539 A1 | 6/2012 | Riesebosch | |
| 2012/0306401 A1 | 12/2012 | Wei et al. | |

OTHER PUBLICATIONS

PCT International Search Report and Written Opinion, PCT Application No. PCT/US2014/018778, Jun. 2, 2014, fourteen pages.

* cited by examiner

*Primary Examiner* — David H Vu
(74) *Attorney, Agent, or Firm* — Fenwick & West LLP

(57) ABSTRACT

An LED controller reduces jitter of an LED lamp. In one embodiment, the LED controller includes a jitter detection circuit adapted to determine an amount of jitter in an input voltage signal. The input voltage signal includes a plurality of cycles and indicates an amount of dimming for the LED lamp. The LED controller further includes a jitter compensation circuit, which generates a control signal to control regulated in the LED lamp such that an output light intensity of the LED lamp substantially corresponds to the amount of dimming for the LED lamp. The control signal controls current delivery to the LED lamp to compensate for the determined amount of jitter in the input voltage signal.

19 Claims, 6 Drawing Sheets

OUTPUT CURRENT COMPENSATION FOR JITTER IN INPUT VOLTAGE FOR DIMMABLE LED LAMPS

CROSS-REFERENCE TO RELATED APPLICATIONS

This application claims the benefit of U.S. Provisional Application No. 61/770,280, filed on Feb. 27, 2013, which is incorporated herein by reference in its entirety.

BACKGROUND OF THE DISCLOSURE

1. Field of the Invention

This disclosure relates to driving LED (Light-Emitting Diode) lamps and, more specifically, to compensating for jitter in the LED lamps.

2. Description of the Related Art

LEDs are being adopted in a wide variety of electronics applications, for example, architectural lighting, automotive head and tail lights, backlights for liquid crystal display devices, flashlights, etc. Compared to conventional lighting sources such as incandescent lamps and fluorescent lamps, LEDs have significant advantages, including high efficiency, good directionality, color stability, high reliability, long life time, small size, and environmental safety.

The use of LEDs in lighting applications is expected to expand, as they provide significant advantages over incandescent lamps (light bulbs) in power efficiency (lumens per watt) and spectral quality. Furthermore, LED lamps represent lower environmental impact compared to fluorescent lighting systems (fluorescent ballast combined with fluorescent lamp) that may cause mercury contamination as a result of fluorescent lamp disposal.

However, conventional LED lamps cannot be direct replacements of incandescent lamps and dimmable fluorescent systems without modifications to current wiring and component infrastructure that have been built around incandescent light bulbs. This is because conventional incandescent lamps are voltage driven devices, while LEDs are current driven devices, requiring different techniques for controlling the intensity of their respective light outputs.

Many dimmer switches adjust the RMS voltage value of the lamp input voltage by controlling the phase angle of the AC-input power that is applied to the incandescent lamp to dim the incandescent lamp. Controlling the phase angle is an effective and simple way to adjust the RMS-voltage supplied to the incandescent bulb and provide dimming capabilities. However, conventional dimmer switches that control the phase angle of the input voltage are not compatible with conventional LED lamps, since LEDs, and thus LED lamps, are current-driven devices.

One solution to this compatibility problem uses an LED driver that senses the lamp input voltage to determine the operating duty cycle of the dimmer switch and reduces the regulated forward current through an LED lamp as the operating duty cycle of the dimmer switch is lowered. However, due to asymmetrical electrical characteristics of dimmer switches, the adjusted phase angle may exhibit low-frequency jittering patterns. The jitter can cause low-frequency LED light flickering that is detectable by the human eye.

SUMMARY

Embodiments described herein provide an LED controller for reducing jitter of an LED lamp. An input voltage signal indicating a desired dimming amount of the LED lamp is input to the LED controller, in one embodiment by a phase cut dimmer switch. The input signal exhibits a jitter pattern. That is, a phase in which the input voltage signal is on is longer in some cycles or half-cycles of the input voltage signal and shorter in other cycles or half-cycles. In one embodiment, the LED controller includes a jitter detection circuit adapted to determine an amount of jitter in an input voltage signal including a plurality of cycles. Durations of on-phases of the input voltage signal during each cycle indicate an amount of dimming for the LED lamp. In one embodiment, the amount of jitter in the input signal corresponds to a difference between durations of on-phases of the input voltage signal between at least two cycles or half-cycles of the input voltage signal. A jitter compensation circuit of the LED controller generates a control signal to control regulated current in the LED lamp such that an output light intensity of the LED lamp substantially corresponds to the desired dimming amount indicated by the input signal. In one embodiment, in order to compensate for the jitter in the input signal, the control signal disables current delivery to the LED lamp during a portion of a longer one of the at least two cycles or half-cycles corresponding to the difference in duration of the on-phases of the input voltage signal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

As will be explained in more detail below with reference to the figures, the LED lamp system and a method according to various embodiments (1) detects jitter of an input voltage from a dimming circuit; (2) generates dimming control signals based on the input voltage and further adjusted based on the detected jitter; and (3) provides corresponding output drive current to the LEDs in the LED lamp based on the dimming control signals to achieve the desired light intensity of the LEDs. By adjusting the dimming control signal responsive to the detected jitter, the LED lamp beneficially controls the energy delivered to the LEDs and prevents low-frequency flickering that is detectable by the human eye.

Figure 1:
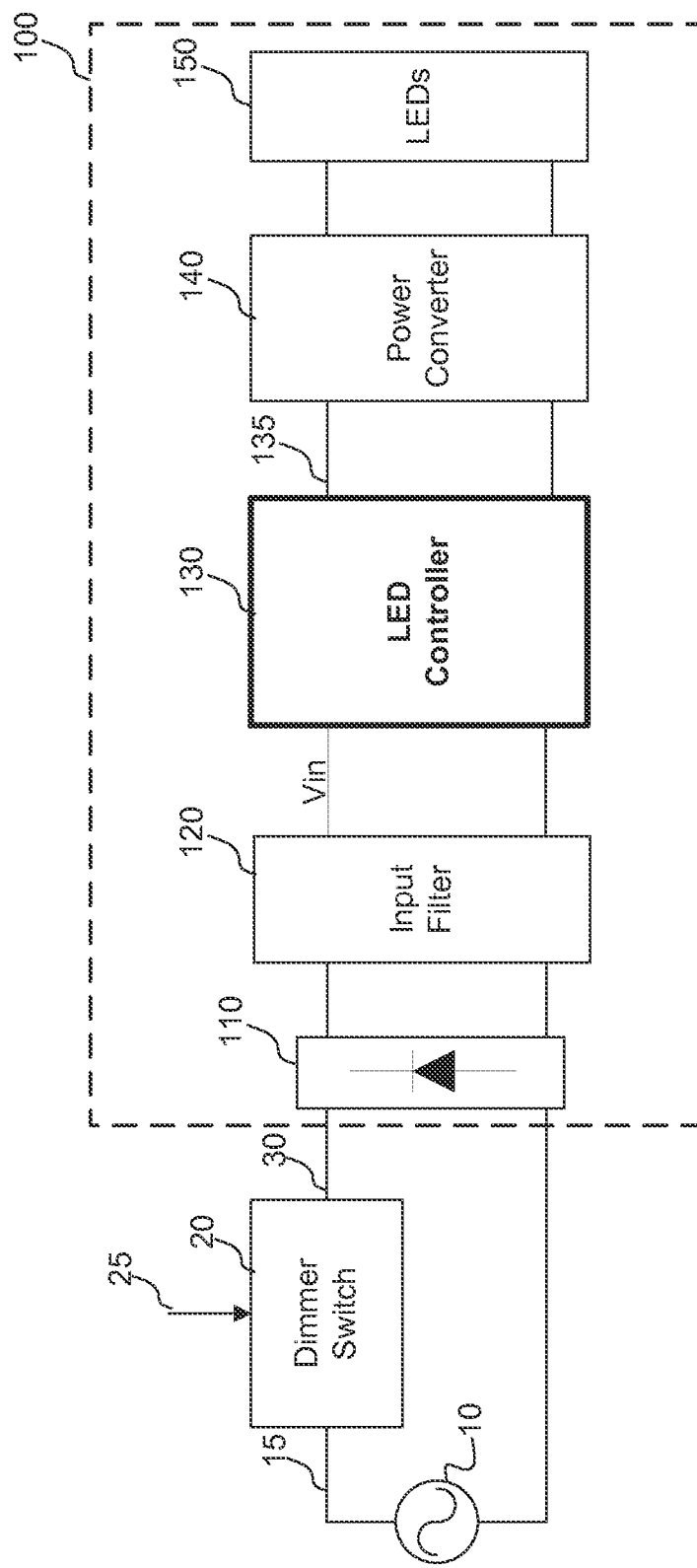
FIG. 1 illustrates an LED lamp circuit, according to one embodiment.

FIG. 1 illustrates an LED lamp system including an LED lamp 100 used with a conventional dimmer switch 20. The LED lamp 100 according to various embodiments is a direct replacement of an incandescent lamp in a conventional dimmer switch setting. A dimmer switch 20 is placed in series with AC input voltage source 10 and LED lamp 100. Dimmer switch 20 is a conventional one that receives a dimming input signal 25, which is used to set the desired light output intensity of LED lamp 100. Dimmer switch 20 receives AC input voltage signal 15 and adjusts the V-RMS value of lamp input voltage 30 in response to dimming input signal 25. In other words, control of the light intensity outputted by LED lamp 100 by dimmer switch 20 is achieved by adjusting the RMS value of the lamp input voltage 30 that is applied to LED lamp 100, in a conventional maimer. The LED lamp 100 controls the light output intensity of LED lamp 100 to vary proportionally to the lamp input voltage 30, exhibiting behavior similar to incandescent lamps, even though LEDs are current-driven devices and not voltage driven devices. Dimming input signal 25 can either be provided manually (via a knob or slider switch, not shown herein) or via an automated lighting control system (not shown herein).

The dimmer switch 20 adjusts the V-RMS of lamp input voltage 30 by controlling the phase angle of the AC input voltage signal 15. In particular, the dimmer switch 20 reduces the V-RMS of input voltage 30 by eliminating a portion of each half-cycle of the AC input signal 15. Depending on the configuration, the dimmer switch 20 may eliminate a portion of the AC input signal 15 at the beginning of each half-cycle (a "leading edge dimmer") or may eliminate a portion of the AC input signal 15 at the end of each half-cycle (a "trailing edge dimmer"). Generally, the dimmer switch 20 increases the dimming effect (i.e., lowers the light intensity) by increasing the portion of each half-cycle that is eliminated and thereby decreasing the dimmer on-time. However, the phase angle corresponding to the dimmer on time may vary from cycle to cycle of the AC input voltage signal 15. The phase angle instability may randomly vary between cycles, or the phase angle may exhibit predictable jittering patterns based on the electrical characteristics of the dimmer switch 20. For example, the asymmetry of certain circuitry in the dimmer switch may cause the dimmer on-phase of the first half of each cycle to be larger than the dimmer on-phase of the second half of each cycle. As another example, if the dimmer switch 20 circuit does not fully reset at each cycle, the dimmer-on phase may increase monotonically over the period of several cycles before resetting to a smaller phase. If the dimmer on-phase varies, different levels of power are delivered to the LEDs from half-cycle to half-cycle. Thus, the intensity of the light output by the LEDs varies between half-cycles of the input voltage, resulting in flickering detectable by the human eye.

As illustrated in FIG. 1, LED lamp 100 comprises a bridge rectifier 110, an input filter 120, LED controller 130, power converter circuit 140, and LEDs 150. Bridge rectifier 110 rectifies lamp input voltage 30 from dimmer switch 20 and provides rectified voltage signal Vin to LED controller 130. In one embodiment, input filter 120 compromises a low-pass filter for EMI suppression of Vin. During normal operation, LED controller 130 outputs control signal 135 to control power converter 140. Power converter 140 drives LEDs 150 based on control signal 135 to achieve the desired dimming effect, as will be described in more detail below. It should be understood that power converter 140 may drive an string having any number of LEDs, or may drive multiple strings of LEDs 150 in parallel.

Figure 2:
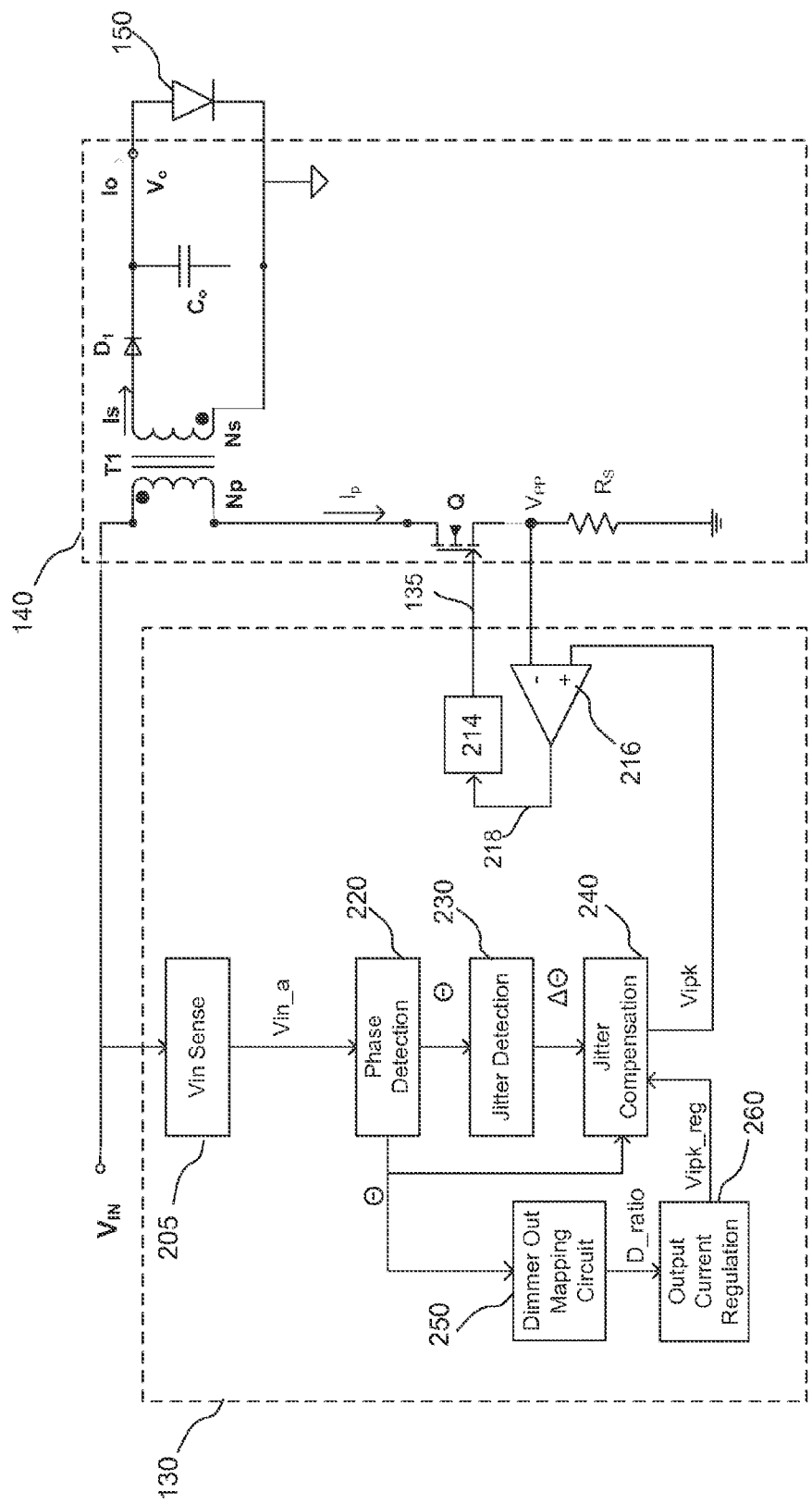
FIG. 2 illustrates circuits of an LED driver, according to one embodiment.

FIG. 2 is a block diagram illustrating details of the LED controller 130 and power converter 140, together forming an LED driver circuit, according to one embodiment. In one embodiment, power converter 140 comprises a flyback converter that includes diode D1, capacitor Co, switch Q, resistor Rs, and transformer T1 having primary winding Np and secondary winding Ns. In one embodiment, LED controller 130 includes switch driver circuit 214, comparator 216, Vin sense circuit 205, phase detection circuit 220, jitter detection circuit 230, jitter compensation circuit 240, dimmer out mapping circuit 250, and output current regulation 260. Those of skill in the art will recognize that other embodiments can have different modules than the ones described here, and that the functionalities can be distributed among the circuits or modules in a different manner. In addition, the functions ascribed to the various circuits or modules can be performed by multiple circuits or modules.

Switch driver circuit 214 generates output drive signal 135 that drives the switch Q to turn it on or off. The input energy from supply voltage Vin is stored in transformer T1 when switch Q is turned on because diode D1 becomes reverse biased. The input energy is then transferred to LEDs 150 across capacitor Co while switch Q is turned off because diode D1 becomes forward biased. Diode D1 functions as an output rectifier and capacitor Co functions as an output filter. The resulting regulated output current to is delivered to LEDs 150.

Switch driver circuit 214 generates switch control signal 135 to control switch Q of power converter 140 such that a substantially constant current is maintained through the LEDs 150. Switch driver circuit 214 can employ any one of a number of modulation techniques, such as pulse-width-modulation (PWM) or pulse-frequency-modulation (PFM), to control the ON and OFF states and duty cycles of power switch Q. PWM and PFM control the switching power converters by controlling the widths or frequencies, respectively, of the output drive pulse 135 driving the switch Q to achieve output power regulation. Thus, switch driver circuit 214 generates appropriate switch drive pulses 135 to control the on-times of power switch Q and regulate the output current Io through the LEDs 150.

The voltage Vpp is used to sense the primary current Ip through the primary winding Np in the form of a voltage across the resistor Rs. The comparator 216 senses and compares the voltage Vpp to the voltage of the regulation signal Vipk, and outputs the signal 218 to the switch driver circuit 214. The voltage Vipk, representing the desired dimming factor of LED lamp 100, sets the reference point of comparator 216. Switch driver circuit 214 implements peak current switching to limit primary current Ip to a value corresponding to Vipk, and turns off the switch Q when Vpp reaches the threshold value Vipk.

Vin sense circuit 205 receives the rectified input voltage Vin and outputs sense voltage Vin_a to phase detection circuit 220. Based on Vin_a, phase detection circuit 220 determines an amount of phase angle modulation applied by the dimmer switch 20. In one embodiment, phase detection circuit 220 determines a dimming phase θ indicating the portion of a cycle of the AC input voltage during which the dimmer switch 20 and thus the rectified input voltage Vin is on (i.e., not cut off by dimmer switch 20). The portion of the input voltage cycle in which Vin is on is referred to herein as the "dimmer-on period."

Dimmer out mapping circuit 250 determines the degree of dimming desired as indicated by dimming input signal 25 and reflected in lamp input voltage Vin. In one embodiment, dimmer out mapping circuit 250 converts the dimming phase θ to an LED dimming ratio D_ratio in the range [0, 1] indicating a fraction of power to deliver to the LEDs to achieve the desired dimming. Thus, when D_ratio=1, the power converter 140 outputs 100% of the available power to the LEDs 150. When D_ratio=0.1, the power converter 140 outputs 10% of available power to the LEDs 150. In one embodiment, the LED dimming ratio D_ratio is computed as follows:

$$D_{ratio} = \theta * K_4 + K_5$$

where K4 and K5 are experimentally determined constants based on the different luminosity curves between incandescent bulbs and LEDs. The constants K4 and K5 are chosen such that the LED lamp 100 will behave like an incandescent lamp in its luminosity response to the dimming control signal 25. Thus, for example, if the dimmer switch 20 is set to 50% dimming level, the LED lamp 100 will control current through the LEDs 150 such that the LEDs output 50% of their maximum output luminosity.

Output current regulation circuit 260 generates regulation signal Vipk_reg based on D_ratio, indicating a nominal peak-current value for the primary current Ip prior to jitter compensation. In one embodiment, output current regulation circuit 260 generates the regulation signal Vipk_reg such that the phase of Vipk_reg follows the phase of input voltage Vin. Vipk_reg is input to the jitter compensation circuit 240 as a reference signal corresponding to the nominal peak-current value for the primary current Ip for driving the switch Q and delivering constant current to LEDs 150.

The jitter detection circuit 230 receives the phase θ determined by the phase detection circuit 220 and determines the average jitter Δθ of Vin. The jitter detection circuit 230 is configured to determine an amount of jitter in the input voltage Vin by determining differences between on-phases of the input voltage Vin in two or more cycles or half-cycles of Vin. For example, the jitter detection circuit 230 determines differences between on-phases of the first half-cycle and the second half-cycle of each cycle of Vin, between two full cycles of Vin, or between non-consecutive cycles or half-cycles (e.g., every third half-cycle). In one embodiment, the jitter detection circuit 230 averages the differences between on-phases of at least one pair of cycles or half-cycles, determining an average amount of jitter in the input voltage Vin.

Figure 3:
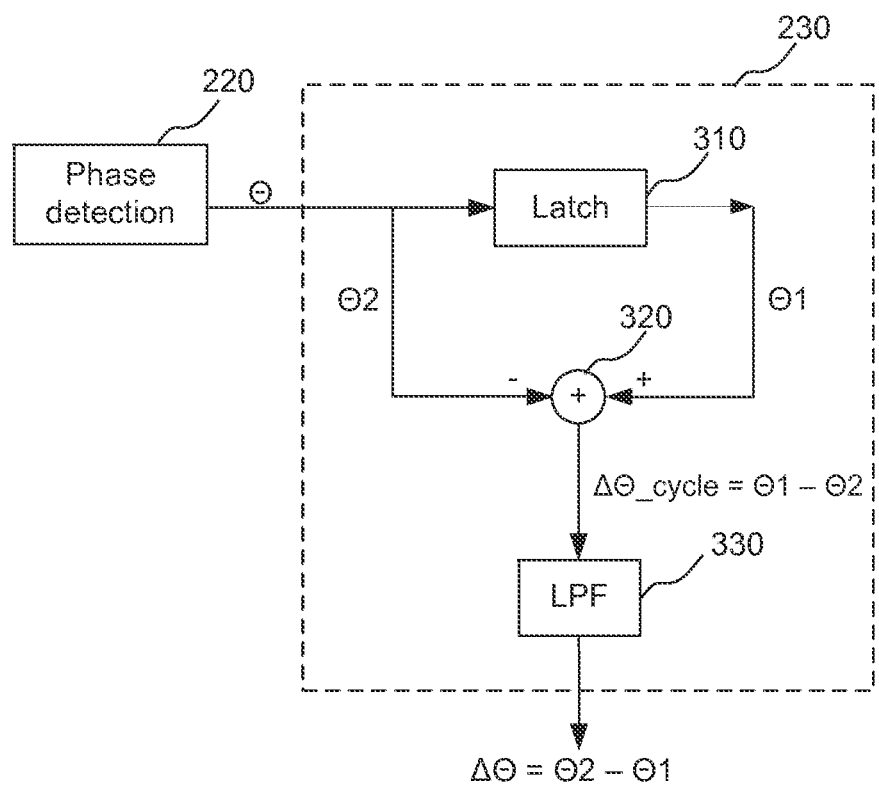
FIG. 3 is a block diagram illustrating a jitter detection circuit in the LED driver, according to one embodiment.

A block diagram of one embodiment of the jitter detection circuit 230 is illustrated in FIG. 3. The embodiment of the jitter detection circuit 230 illustrated in FIG. 3 determines an amount of jitter in the input voltage Vin by measuring phase angle differences between on-phases of two or more cycles or half-cycles of the input voltage Vin. Other embodiments of the jitter detection circuit 230 use other methods determine the amount of jitter, such as by determining differences between average voltages or amounts of power dissipated in two or more cycles or half-cycles of the voltage Vin. As shown in FIG. 3, one embodiment of the jitter detection circuit 230 comprises latch 310, summation block 320, and low-pass filter 330. At each half-cycle of the input voltage Vin, jitter detection circuit 230 receives the dimming phase θ, indicating the portion of the cycle in which input voltage Vin is on (i.e., not cut off), from the phase detection circuit 220. Latch 310 latches the dimming phase θ at each half-cycle for comparison to the dimming phase θ of the next half-cycle of the input voltage Vin. For example, FIG. 3 illustrates latch 310 storing θ1, the dimming phase of the first half-cycle of a cycle of the input voltage Vin, fir comparison to θ2, the dimming phase of the second half of the cycle. The summation block 320 determines a dimming phase difference Δθ_cycle between the two half-cycles of each cycle of the input voltage Vin by subtracting the current phase θ2 from the latched phase θ1. The low pass filter 330 receives the Δθ_cycle for each cycle and outputs Δθ, representing a moving average of the dimming phase jitter, for example, over 1, 1.5, 2, 2.5, 3, or more AC cycles of the input voltage Vin.

Returning to FIG. 2, the jitter compensation circuit 240 receives the voltage regulation signal Vipk_reg from output current regulation block 260 and the determined amount of jitter, such as the average jitter Δθ, from jitter detection circuit 230. Based on Vipk_reg and the determined amount of jitter, the jitter compensation circuit 240 generates the drive signal Vipk. In one embodiment, the jitter compensation circuit 240 compensates for jitter based on repeated patterns in the jitter. More specifically, the jitter compensation circuit 240 identifies the current stage of Vipk_reg (e,g., the first or second half of an AC voltage cycle) based on dimming phase θ measured by the phase detection circuit 220. For example, the phase $\theta_1$ of the first half of each cycle may be longer than the phase $\theta_2$ of the second half of the same cycle; the jitter compensation circuit 240 determines that Vipk_reg is in the first half of a cycle of the input voltage Vin when the dimming phase of the cycle is greater than the phase of the previous half-cycle. As another example, if the dimmer switch 20 does not fully reset between half-cycles, the dimming phase may monotonically increase over the course of three or more half-cycles (i.e., across several full cycles) of the input voltage Vin. That is, the dimming phase $\theta_N$ of the Nth half-cycle may be longer than the phase $\theta_{N-1}$ of the (N−1) half-cycle, which in turn is longer than the phase $\theta_{N-2}$ of the (N−2) half-cycle, where half-cycles N and N−1 or half-cycles N−1 and N−2 occur in the same cycle of the input voltage Vin. The jitter compensation circuit 240 compares the phase of the current half-cycle to the phase of the previous half-cycle to determine whether the phase is monotonically increasing over the course of several half-cycles or cycles of the input voltage Vin. In another embodiment, the jitter compensation circuit 240 receives an identifier of the current stage (that is, whether the current dimming phase is longer than the previous dimming phase) or the dimming phase difference Δθ_cycle from jitter detection circuit 230.

In general, if the current half-cycle of the input signal has a longer dimming phase θ than the previous stage, the jitter compensation circuit 240 sets Vipk to substantially zero for a portion of the current half-cycle corresponding to the phase difference Δθ. If the dimmer switch 20 is a leading edge dimmer, the jitter compensation circuit 240 sets Vipk to substantially zero at the beginning of each half-cycle of the input voltage Vin determined to have a longer dimmer-on phase. If the dimmer switch 20 is a trailing edge dimmer, the jitter compensation circuit 240 sets Vipk to substantially zero at the end of each half-cycle of the input voltage Vin determined to have a longer dimmer-on phase. Because Vipk is set to substantially zero during the portion of the cycle corresponding to Δθ, switch drive controller 214 switches off switch Q during the portion of the cycle corresponding to Δθ. In one embodiment, after Δθ has elapsed, the jitter compensation circuit 240 passes the value of Vipk_reg to Vipk, such that Vipk follows the shape of Vipk_reg for the remainder of the half-cycle of the input voltage Vin. If the current stage has a shorter dimming phase θ than the previous stage, the jitter compensation circuit 240 passes Vipk_reg to Vipk with no jitter compensation. Thus, the jitter compensation circuit 240 reduces the difference between conduction periods of successive half-cycles of the input voltage Vin transferred to the control signal Vipk, thereby reducing the effect of jitter caused by the average phase difference Δθ in the input voltage Vin. The jitter compensation circuit 240 outputs Vipk to the power converter 140 for regulating current through the LEDs 150.

Figure 4:
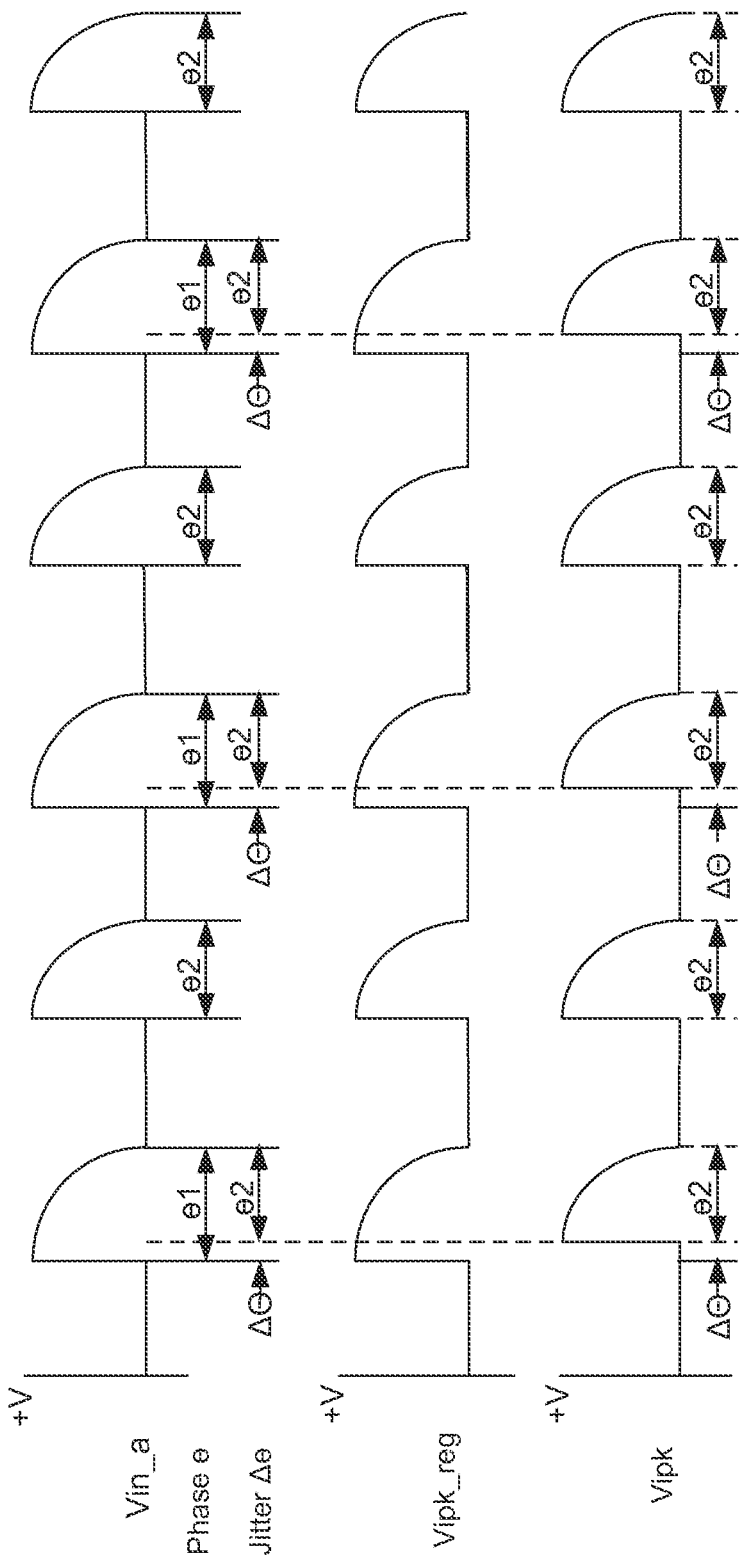
FIG. 4 illustrates waveforms showing operation of a jitter compensation circuit, according to one embodiment.

FIG. 4 illustrates example waveforms comparing signals Vin_a, Vipk_reg, and Vipk of FIG. 2, according to one embodiment. Vin_a is the rectified input voltage signal subject to phase angle switching for dimming. In the example illustrated in FIG. 4, the dimmer switch 20 is a leading edge dimmer and thus the beginning of each half-cycle of Vin_a is cut off. However, the dimmer switch 20 may alternatively be a trailing edge dimmer, in which case the end of each half-cycle of Vin_a is cut off. The dimming phases $\theta_1$ and $\theta_2$ correspond to the phase at the first and second half-cycles, respectively, of a full period of the rectified input voltage signal Vin. As shown in FIG. 4, $\theta_1$ is greater than $\theta_2$, resulting in a positive Δθ_cycle between each half-cycle. Because output current regulation circuit 260 generates Vipk_reg based on the phase of each half-cycle, Vipk_reg exhibits the jitter present in Vin_a since the phases during which Vipk_reg is on is not symmetrical from half-cycle to half-cycle. The illustrated Vipk waveform demonstrates the phase of the control signal Vipk being reduced by the average jitter Δθ after jitter compensation circuit 240 compensates for such jitter by maintaining Vipk at substantially zero during the average phase difference Δθ at the beginning of the half-cycle with longer phase (θ1), such that the Vipk signal in each half period has phase $\theta_2$. Because Vipk serves as the reference fur peak current switching by the switch driver circuit 214 and power converter 140, the regulated phase $\theta_2$ delivers consistent power across cycles of the input voltage and thereby reduces low-frequency flickering of the LEDs 150.

Other embodiments of the jitter detection circuit 230 detect jitter by measuring factors other than the phase difference Δθ between on-phases of two or more cycles or half-cycles of the input voltage Vin. For example, one embodiment of the jitter detection circuit 230 determines an area under the curve of voltage plotted against time, represented by an average value of Vin in each cycle or half-cycle, an amount of power dissipated when the Vin is applied across a resistor, or the like. As phase differences between on-phases of the voltage Vin caused by jitter result in variations in the area under the curve of the input voltage, the difference in area between two cycles or half-cycles of the input voltage Vin corresponds to an amount of jitter in the signal. The jitter detection circuit 230 compares the average value or power measured for two or more cycles or two or more half-cycles of the input voltage Vin to determine the amount of jitter in Vin.

Figure 5:
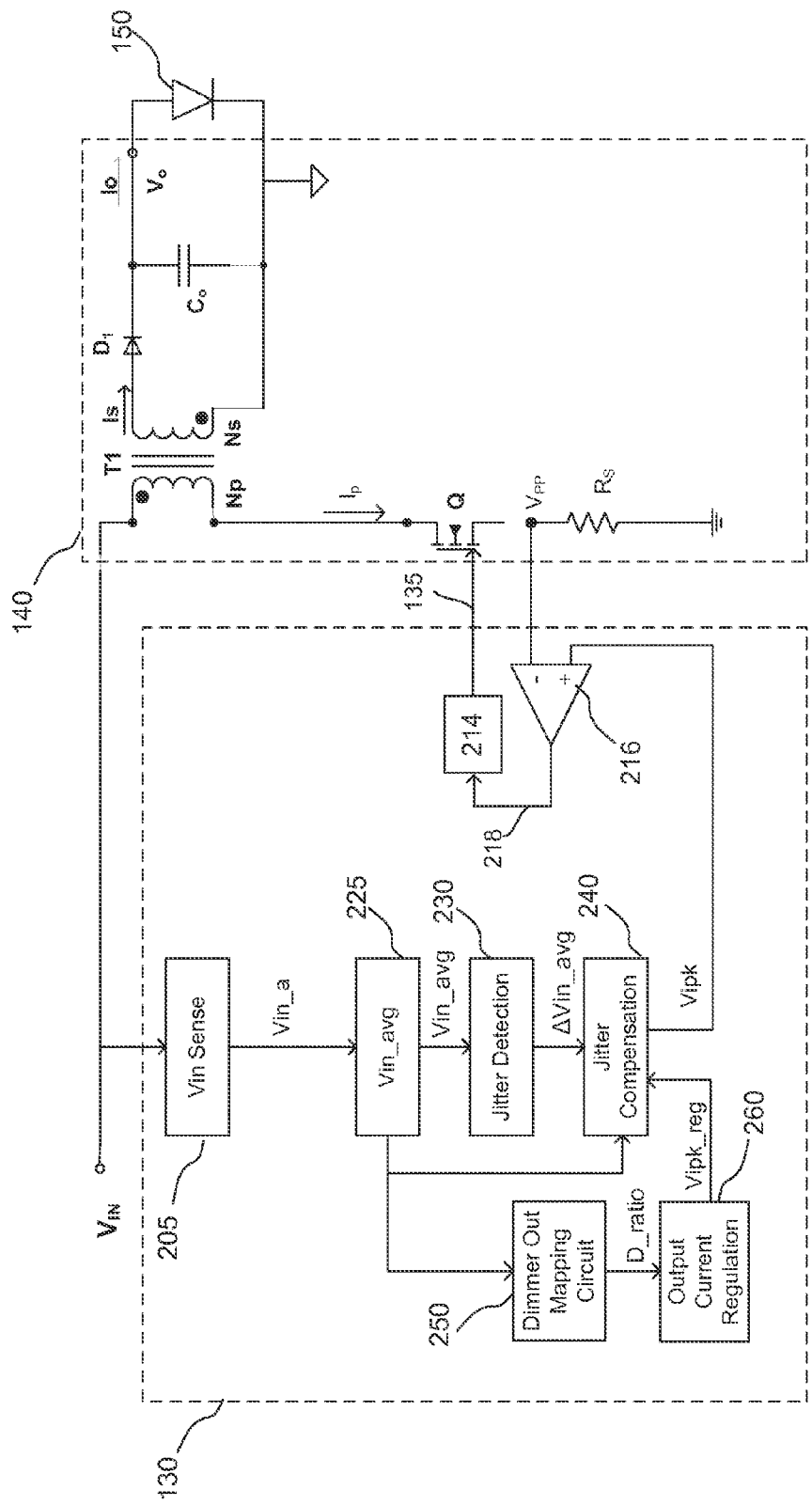
FIG. 5 illustrates circuits of an LED driver, according to an alternative embodiment.

FIG. 5 illustrates an alternative embodiment of the LED controller 130 adapted to detect jitter based on the average value of the input voltage Vin. As shown in FIG. 5, the LED controller 130 includes a Vin_avg determination module 225, which determines an average voltage Vin_avg of each cycle or half-cycle of the input voltage Vin output from Vin sense module 205. In this case, an amount of jitter in the input signal is represented by a difference in the average voltage measured in two or more cycles or half-cycles of the input voltage Vin. To this end, the jitter detection circuit 230 receives the average voltage Vin_avg and determines a difference ΔVin_avg between the average voltage measured in two or more cycles or half-cycles of the input voltage Vin. For example, the jitter detection circuit 230 determines differences between average voltage of the first half-cycle and the second half-cycle of each cycle of Vin, between two full cycles of Vin, or between non-consecutive cycles or half-cycles (e.g., every third half-cycle). In one embodiment, the jitter detection circuit 230 averages the differences between average voltages of at least one pair of cycles or half-cycles, determining an average amount of jitter in the input voltage Vin.

The jitter compensation circuit 240 receives the regulation signal Vipk_reg and the average voltage difference ΔVin_avg, and generates the control signal Vipk to compensate for the determined amount of jitter. If the current cycle or half-cycle has a smaller average voltage Vin_avg than the previous cycle or half-cycle, the jitter compensation circuit 240 passes Vipk_reg to Vipk with no jitter compensation. If the current cycle or half-cycle has a larger average voltage Vin_avg than the previous cycle or half-cycle, the jitter compensation circuit 240 sets the peak value of Vipk by scaling Vipk_reg by a ratio of larger average voltages to smaller average voltages of Vin. For example, if the first half-cycle of each cycle of Vin has average value Vin_avg 1 and the second half-cycle has average value Vin_avg 2, where Vin_avg 1 is greater than Vin_avg 2, the jitter compensation circuit 240 multiplies the magnitude of Vipk_reg in the first half-cycle by a ratio:

$$K = \frac{\text{Vin\_avg2}}{\text{Vin\_avg1}}$$

thereby setting the average value of Vipk in the first half-cycle to be substantially equal to the average value of Vipk in the second half-cycle. Other parts of the LED driver of FIG. 5 operate in a manner similar to that in FIG. 2 and explanation of those parts is not repeated herein, for clarity of illustration.

Figure 6:
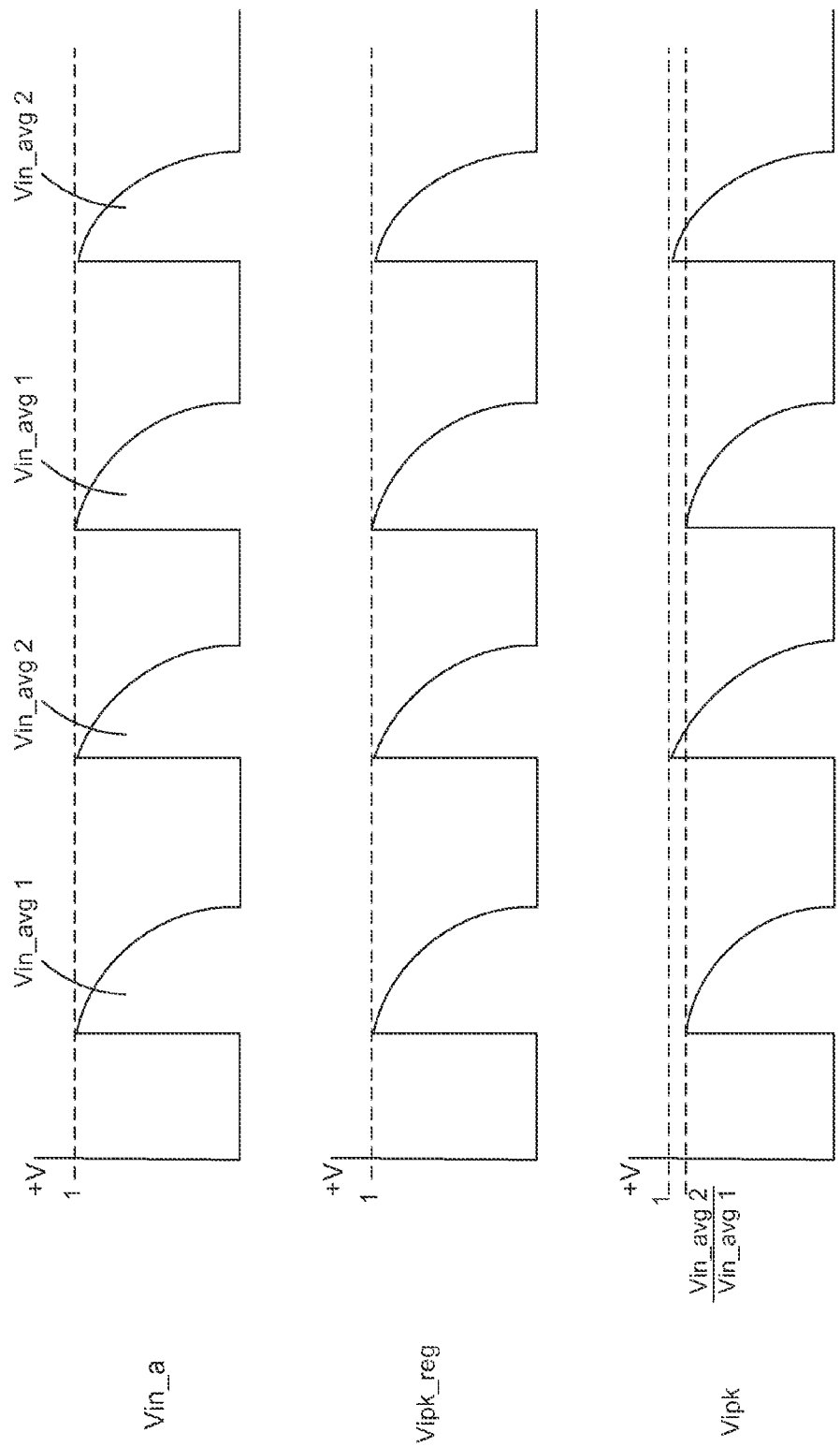
FIG. 6 illustrates waveforms showing operation of a jitter compensation circuit, according to an alternative embodiment.

FIG. 6 illustrates example waveforms comparing signals Vin_a, Vipk_reg, and Vipk of FIG. 5, according to one embodiment. As described above, Vin_a is the rectified input voltage signal subject to phase angle switching for dimming. The average voltages Vin_avg 1 and Vin_avg 2 represent the average value of Vin_a in the first and second half-cycles, respectively of a full period of the rectified input voltage signal Vin. As shown in FIG. 6, Vin_avg 1 is greater than Vin_avg 2. The illustrated Vipk waveform, normalized to the peak value of Vipk during the second half-cycle for simplicity, demonstrates the average value of the control signal Vipk being reduced by scaling Vipk_reg by a ratio between Vin_avg 1 and Vin_avg 2. Thus, the average voltage of Vipk is substantially equal to Vin_avg 2 in both the first half-cycle and the second half-cycle of the input voltage signal Vin. As Vipk serves as the reference for peak current switching by the switch driver circuit 214 and power converter 140, the regulated average voltage Vin_avg 2 delivers consistent power across cycles of the input voltage an thereby reduces low-frequency flickering of the LEDs 150.

The LED lamps according to various embodiments of the present disclosure have the advantage that the LED lamp can be a direct replacement of conventional incandescent lamps in typical wiring configurations found in residential and commercial lighting applications, and that the LED lamp can be used with conventional dimmer switches that carry out dimming by changing the input voltage to the lamps. Moreover, various embodiments of jitter compensation circuit 240 beneficially regulate the driver on times such that power is delivered to the LEDs for the same portion of each AC cycle. Thus, the LED driver can provide a stable output current even if the dimmer phase input is jittering.

Upon reading this disclosure, those of skill in the art will appreciate still additional alternative designs for an LED lamp. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

What is claimed is:

1. An LED controller for reducing jitter of an LED lamp, the LED controller comprising:
    a jitter detection circuit adapted to determine an amount of jitter in an input voltage signal, the input voltage signal including a plurality of cycles and indicative of an amount of dimming for the LED lamp by durations of on-phases of the input voltage signal during each cycle, wherein the amount of jitter corresponds to a difference between durations of on-phases of the input voltage signal between at least two cycles or half-cycles of the input voltage signal; and
    a jitter compensation circuit adapted to generate a control signal to control regulated current in the LED lamp such that an output light intensity of the LED lamp substantially corresponds to the amount of dimming for the LED lamp, the control signal enabling current delivery to the LED lamp during an entire duration of a shorter one of the at least two cycles or half-cycles, disabling current delivery to the LED lamp during a portion of a longer one of the at least two cycles or half-cycles that corresponds to the difference in duration of the on-phases of the input voltage signal to compensate for the determined amount of jitter in the input voltage signal, and enabling current delivery to the LED lamp for a remaining portion of the longer one of the at least two cycles or half-cycles, wherein the remaining portion of the longer one of the at least two cycles or half-cycles is equivalent in duration to the entire duration of the shorter one of the at least two cycles or half-cycles.

2. The LED controller of claim 1, wherein the input voltage signal is indicative of the amount of dimming for the LED lamp by phase angle switching.

3. The LED controller of claim 1, further comprising:
    a phase detection circuit adapted to receive from a phase-cut dimmer switch the input voltage signal and detect the durations of on phases of the cycles or half-cycles of the input voltage signal corresponding to the amount of dimming for the LED lamp.

4. The LED controller of claim 3, wherein the phase-cut dimmer switch is a leading edge dimmer switch, and wherein the jitter compensation circuit generates the control signal to disable current delivery to the LED lamp at a leading edge of the longer one of said at least two cycles or half-cycles corresponding to the difference in duration of the on-phases of the input voltage signal.

5. The LED controller of claim 3, wherein the phase-cut dimmer switch is a trailing edge dimmer switch, and wherein the jitter compensation circuit generates the control signal to disable current delivery to the LED lamp at a trailing edge of the longer one of said at least two cycles or half-cycles corresponding to the difference in duration of the on-phases of the input voltage signal.

6. The LED controller of claim 1, wherein the amount of jitter corresponds to the difference between durations of on-phases of the input voltage signal between at least two consecutive half-cycles of the input voltage signal.

7. The LED controller of claim 1, wherein the amount of jitter corresponds to the difference between durations of on-phases of the input voltage signal between at least two consecutive half-cycles of the input voltage signal averaged over a plurality of cycles of the input voltage signal.

8. The LED controller of claim 1, further comprising:
    a switching power converter adapted to deliver regulated current to the LED lamp, a power switch of the switching power converter being switched on or off based on the control signal to provide the regulated current to the LED lamp;
    wherein the jitter compensation circuit is adapted to disable current delivery to the LED lamp by switching off the power switch during the portion of the longer one of said at least two cycles or half-cycles corresponding to the difference in duration of the on-phases of the input voltage signal and enable current delivery to the LED lamp by switching on the power switch during the entire duration of the shorter one of the at least two cycles or half-cycles and during the remaining portion of the longer one of the at least two cycles or half-cycles.

9. The LED controller of claim 8, further comprising:
    output current regulation circuit adapted to generate a regulation signal to control a peak current value through the power switch, the regulation signal having phases corresponding to the on-phases of the input voltage signal;
    wherein the jitter compensation circuit is adapted to receive the regulation signal and generate the control signal based on the regulation signal to disable current delivery to the LED lamp by switching off the power switch during the portion of the longer one of said at least two cycles or half-cycles corresponding to the difference in duration of the on-phases of the input voltage signal and enable current delivery to the LED lamp by switching on the power switch during the entire duration of the shorter one of the at least two cycles or half-cycles and during the remaining portion of the longer one of the at least two cycles or half-cycles.

10. A method for reducing jitter of an LED lamp, the method comprising:
    determining an amount of jitter in an input voltage signal, the input voltage signal including a plurality of cycles and indicative of an amount of dimming for the LED lamp by durations of on-phases of the input voltage signal during each cycle, wherein the amount of jitter corresponds to a difference between durations of on-phases of the input voltage signal between at least two cycles or half-cycles of the input voltage signal; and
    generating a control signal to control regulated current in the LED lamp such that an output light intensity of the LED lamp substantially corresponds to the amount of dimming for the LED lamp, the control signal enabling current delivery to the LED lamp during an entire duration of a shorter one of the at least two cycles or half-cycles, disabling current delivery to the LED lamp during a portion of a longer one of the at least two cycles or half-cycles that corresponds to the difference in duration of the on-phases of the input voltage signal to compensate for the determined amount of jitter in the input voltage signal, and enabling current delivery to the LED lamp for a remaining portion of the longer one of the at least two cycles or half-cycles, wherein the remaining portion of the longer one of the at least two cycles or half-cycles is equivalent in duration to the entire duration of the shorter one of the at least two cycles or half-cycles.

11. The method of claim 10, wherein the input voltage signal is indicative of the amount of dimming for the LED lamp by phase angle switching.

12. The method of claim 10, further comprising:
receiving the input voltage signal from a phase-cut dimmer switch; and
detecting the durations of on phases of the cycles or half-cycles of the input voltage signal corresponding to the amount of dimming for the LED lamp.

13. The method of claim 12, wherein the phase-cut dimmer switch is a leading edge dimmer switch, and wherein the control signal disables current delivery to the LED lamp at a leading edge of the longer one of said at least two cycles or half-cycles corresponding to the difference in duration of the on-phases of the input voltage signal.

14. The method of claim 12, wherein the phase-cut dimmer switch is a trailing edge dimmer switch, and wherein the control signal disables current delivery to the LED lamp at a trailing edge of the longer one of said at least two cycles or half-cycles corresponding to the difference in duration of the on-phases of the input voltage signal.

15. The method of claim 10, wherein the amount of jitter corresponds to the difference between durations of on-phases of the input voltage signal between at least two consecutive half-cycles of the input voltage signal.

16. The method of claim 10, wherein the amount of jitter corresponds to the difference between durations of on-phases of the input voltage signal between at least two consecutive half-cycles of the input voltage signal averaged over a plurality of cycles of the input voltage signal.

17. The method of claim 10, further comprising:
delivering regulated current to the LED lamp by a switching power converter, a power switch of the switching power converter being switched on or off based on the control signal to provide the regulated current to the LED lamp;
wherein disabling current delivery to the LED lamp comprises switching off the power switch during the portion of a longer one of said at least two cycles or half-cycles corresponding to the difference in duration of the on-phases of the input voltage signal; and
wherein enabling current delivery to the LED lamp comprises switching on the power switch during the entire duration of the shorter one of the at least two cycles or half-cycles and during the remaining portion of the longer one of the at least two cycles or half-cycles.

18. The method of claim 17, further comprising:
generating a regulation signal to control a peak current value through the power switch, the regulation signal having phases corresponding to the on-phases of the input voltage signal;
wherein the control signal is generated based on the regulation signal to disable current delivery to the LED lamp by switching off the power switch during the portion of a longer one of said at least two cycles or half-cycles corresponding to the difference in duration of the on-phases of the input voltage signal and enable current delivery to the LED lamp by switching on the power switch during the entire duration of the shorter one of the at least two cycles or half-cycles and during the remaining portion of the longer one of the at least two cycles or half-cycles.

19. An LED controller for reducing jitter of an LED lamp, the LED controller comprising:
a jitter detection circuit adapted to determine an amount of jitter in an input voltage signal, the input voltage signal including a plurality of cycles and indicative of an amount of dimming for the LED lamp by durations of on-phases of the input voltage signal during each cycle, wherein the amount of jitter corresponds to a difference between respective average voltages of at least two cycles or half-cycles of the input voltage signal; and
a jitter compensation circuit adapted to generate a control signal to control regulated current in the LED lamp such that an output light intensity of the LED lamp substantially corresponds to the amount of dimming for the LED lamp, the jitter compensation circuit generating the control signal by scaling a magnitude of the input signal by a ratio of a smaller average voltage of the at least two cycles or half-cycles of the input voltage signal to a larger average voltage of another one of the at least two cycles or half-cycles of the input voltage signal.

\* \* \* \* \*